US012568043B1

(12) United States Patent
Jacobs et al.

(10) Patent No.: US 12,568,043 B1
(45) Date of Patent: Mar. 3, 2026

(54) COMPUTER NETWORK ROUTING SYSTEMS AND METHODS FOR ROUTING PACKAGES

(71) Applicant: Scripventures Group, Ltd., Spring, TX (US)

(72) Inventors: Keith M. Jacobs, Plano, TX (US);
Paul J. Thomas, Spring, TX (US);
Stephen G. Thomas, Spring, TX (US);
Gregory P. Andress, Plano, TX (US)

(73) Assignee: Scripventures Group, Ltd., Spring, TX (US)

( * ) Notice: Subject to any disclaimer, the term of this patent is extended or adjusted under 35 U.S.C. 154(b) by 0 days.

(21) Appl. No.: 19/263,371

(22) Filed: Jul. 8, 2025

Related U.S. Application Data

(63) Continuation of application No. 17/192,538, filed on Mar. 4, 2021.

(51) Int. Cl.
G16H 20/10 (2018.01)
H04L 45/50 (2022.01)

(52) U.S. Cl.
CPC .................................... H04L 45/50 (2013.01)

(58) Field of Classification Search
CPC ........ G06Q 40/08; G16H 20/10; G16H 40/67;
G16H 40/20
See application file for complete search history.

(56) References Cited

U.S. PATENT DOCUMENTS

| | | | |
|---|---|---|---|
| 8,712,797 B1 | 4/2014 | Bezdek et al. | |
| 10,073,951 B2 | 9/2018 | Mohebbi et al. | |
| 10,552,575 B1 | 2/2020 | Mohebbi et al. | |
| 10,896,244 B2 | 1/2021 | Mohebbi et al. | |
| 11,379,369 B1 * | 7/2022 | Martincic | .......... G06Q 30/0222 |
| 11,756,104 B1 * | 9/2023 | Hopkins | ............ G06Q 30/0603 |
| | | | 705/26.82 |
| 12,020,793 B1 * | 6/2024 | Hopkins | ................ G16H 20/10 |
| 12,176,086 B1 * | 12/2024 | Arends | ................. G06F 16/252 |
| 12,347,551 B1 * | 7/2025 | Kaneria | .............. H04L 63/1416 |
| 12,367,954 B1 * | 7/2025 | Aragon | .............. G06Q 30/0207 |

(Continued)

FOREIGN PATENT DOCUMENTS

WO     WO-2015/200197     12/2015

*Primary Examiner* — Syed Ali
(74) *Attorney, Agent, or Firm* — FOLEY & LARDNER LLP

(57) ABSTRACT

Systems and methods for routing packages between a plurality of computer network originator systems and a plurality of computer network processing systems. The computer network routing system can include one or more processing circuits including one or more processors and memory storing instructions that, when executed by the one or more processors, cause the one or more processors to perform operations. The operations include providing an interface for registering at least one user with a computer network routing system, wherein the at least one network is at least one of a local area network (LAN), wide area network (WAN), a telephone network, a wireless link, an intranet, or internet. The operations include issuing at least one UPC to the at least one user. The operations include receiving and selecting a computer network processing system. The operations include updating at least one first data segment and transmitting the routing package.

20 Claims, 7 Drawing Sheets

(56)        References Cited

U.S. PATENT DOCUMENTS

| | | | |
|---|---|---|---|
| 2009/0327363 | A1 | 12/2009 | Cullen et al. |
| 2014/0244279 | A1 | 8/2014 | Bezdek et al. |
| 2014/0244546 | A1 | 8/2014 | Bezdek et al. |
| 2015/0154668 | A1 | 6/2015 | Bezdek et al. |
| 2017/0039331 | A1 | 2/2017 | Bezdek et al. |
| 2020/0219017 | A1* | 7/2020 | Simpson ............ G01C 21/3438 |
| 2021/0074401 | A1 | 3/2021 | Bezdek et al. |
| 2021/0210185 | A1 | 7/2021 | Allred et al. |
| 2022/0067651 | A1* | 3/2022 | Kawaguchi ........ G06Q 10/0833 |

* cited by examiner

500

510
Receive a prescription drug claim

520
Obtain a set of rules for routing the prescription drug claim

530
Select a PBM from the plurality of PBMs

540
Modify the routing information of the prescription drug claim

550
Send the prescription drug claim to the selected PBM

COMPUTER NETWORK ROUTING SYSTEMS AND METHODS FOR ROUTING PACKAGES

CROSS-REFERENCE TO RELATED APPLICATION(S)

This application is a continuation of U.S. patent application Ser. No. 17/192,538, filed Mar. 4, 2021, the entire disclosure of which is incorporated by reference herein.

BACKGROUND

The present disclosure relates generally to routing packages. In a computer networked environment such as the internet, users and entities such as people or companies submit network routing requests.

SUMMARY

In some aspects, the techniques described herein relate to a computer network routing system for routing packages between a plurality of computer network originator systems and a plurality of computer network processing systems, the computer network routing system including: one or more processing circuits including one or more processors and memory storing instructions that, when executed by the one or more processors, cause the one or more processors to perform operations including: providing, via at least one network, an interface for registering at least one user with a computer network routing system, wherein the at least one network is at least one of a local area network (LAN), wide area network (WAN), a telephone network, a wireless link, an intranet, or internet; receiving, from the interface via the at least one network, a request to generate at least one universal prescription card (UPC) for the at least one user; generating the at least one UPC for the at least one user, the at least one UPC including computer network routing information that causes a computer network originator system to transmit one or more routing packages to the computer network routing system using the computer network routing information in the UPC; issuing the at least one UPC to the at least one user; receiving, via the at least one network, a routing package from the computer network originator system, the routing package including the computer network routing information in the at least one UPC issued to the at least one user that causes the computer network originator system to transmit the routing package to the computer network routing system, wherein the routing package includes a plurality of data segments, wherein the computer network routing information uniquely identifies data corresponding to the UPC issued to the at least one user; selecting a computer network processing system from the plurality of computer network processing systems by applying a set of network rules to the routing package; updating at least one first data segment of the plurality of data segments of the computer network routing information of the routing package based on a scheme of a plurality of schemes of the computer network processing system corresponding with criteria for the routing package to the selected computer network processing system; in response to updating the at least one first data segment of the routing package, transmitting, via the at least one network to a network processing system computing system, the routing package to the selected network processing system corresponding with the updated computer network routing information; and transmitting, via the at least one network to the computer network originator system, an updated response including a message indicating completion by the network processing system computing system.

In some aspects, the techniques described herein relate to a computer network routing system, wherein the at least one first data segment including updated computer network routing information corresponding to the selected computer network processing system, wherein the at least one first data segment is updated to convert a portion of the computer network routing information from first computer network routing information not specific to the selected network processing system into second computer network routing information specific to the selected computer network processing system.

In some aspects, the techniques described herein relate to a computer network routing system, the operations further including in response to receiving via the at least one network a network response from the selected computer network processing system, updating at least one second data segment of the response of the plurality of data segments.

In some aspects, the techniques described herein relate to a computer network routing system, wherein updating the at least one second data segment of the response is based on customized selection criteria customized by at least one of the selected computer network processing system, the computer network originator system, a customer, or an entity, wherein a message segment of the at least one second data segment is updated indicating a status of the routing package.

In some aspects, the techniques described herein relate to a computer network routing system, the operations further including in response to updating the at least one second data segment of the response, transmitting, in real-time via the at least one network with the computer network originator system, the updated response including the message indicating completion and the updated at least one second data segment to the computer network originator system.

In some aspects, the techniques described herein relate to a computer network routing system, the operations further including transmitting, in real-time to the at least one user, a notification indicating the completion of the updated response.

In some aspects, the techniques described herein relate to a computer network routing system, the operations further including: receiving the response from the selected computer network processing system responsive to transmitting the routing package to the selected computer network processing system for processing; updating the response from the selected computer network processing system to include information identifying the selected computer network processing system; and transmitting the updated response to the computer network originator system.

In some aspects, the techniques described herein relate to a computer network routing system, wherein: obtaining the set of network rules includes using one or more attributes of the routing package to select one or more network rules applicable to the routing package; and the one or more network rules applicable to the routing package define the criteria for selecting the computer network processing system from the plurality of computer network processing systems.

In some aspects, the techniques described herein relate to a computer network routing system, wherein: the request identifies a plan of the at least one user; the selected computer network processing system provides multiple different plans; and selecting the computer network processing system includes selecting the plan from the multiple different plans provided by the selected computer network processing system by applying the set of network rules to the multiple different plans.

In some aspects, the techniques described herein relate to a computer network routing system, wherein selecting the computer network processing system from the plurality of computer network processing systems includes using one or more attributes of the routing package to identify a plan applicable to the routing package; and applying the set of network rules to the plan and one or more alternative plans applicable to the routing package.

In some aspects, the techniques described herein relate to a computer network routing system, wherein: the set of network rules defines a set of currently available plan options for processing the routing package, each of the set of currently available plan options corresponding to the computer network processing system of the plurality of computer network processing systems; and selecting the computer network processing system from the plurality of computer network processing systems includes analyzing the set of currently available plan options according to the set of network rules to select a plan from the set of currently available plan options.

In some aspects, the techniques described herein relate to a computer network routing system, the operations further including: transmitting the routing package to each computer network processing system of the plurality of computer network processing systems corresponding to the set of currently available plan options; and receiving additional responses from the plurality of computer network processing systems corresponding to the set of currently available plan options responsive to the routing package; wherein evaluating the set of currently available plan options includes analyzing the additional responses received the plurality of computer network processing systems corresponding to the set of currently available plan options according to the set of network rules.

In some aspects, the techniques described herein relate to a method for routing packages between a plurality of computer network originator systems and a plurality of computer network processing systems, the method including: providing, via at least one network, an interface for registering at least one user with a computer network routing system, wherein the at least one network is at least one of a local area network (LAN), wide area network (WAN), a telephone network, a wireless link, an intranet, or internet; receiving, from the interface via the at least one network, a request to generate at least one universal prescription card (UPC) for the at least one user; generating the at least one UPC for the at least one user, the at least one UPC including computer network routing information that causes a computer network originator system to transmit one or more routing packages to the computer network routing system using the computer network routing information in the UPC; issuing the at least one UPC to the at least one user; receiving, via the at least one network, a routing package from the computer network originator system, the routing package including the computer network routing information in the at least one UPC issued to the at least one user that causes the computer network originator system to transmit the routing package to the computer network routing system, wherein the routing package includes a plurality of data segments, wherein the computer network routing information uniquely identifies data corresponding to the UPC issued to the at least one user; selecting a computer network processing system from the plurality of computer network processing systems by applying a set of network rules to the routing package; updating at least one first data segment of the plurality of data segments of the computer network routing information of the routing package based on a scheme of a plurality of schemes of the computer network processing system corresponding with criteria for the routing package to the selected computer network processing system; in response to updating the at least one first data segment of the routing package, transmitting, via the at least one network to a network processing system computing system, the routing package to the selected network processing system corresponding with the updated computer network routing information; and transmitting, via the at least one network to the computer network originator system, an updated response including a message indicating completion by the network processing system computing system.

In some aspects, the techniques described herein relate to a method, wherein the at least one first data segment including updated computer network routing information corresponding to the selected computer network processing system, wherein the at least one first data segment is updated to convert a portion of the computer network routing information from first computer network routing information not specific to the selected network processing system into second computer network routing information specific to the selected computer network processing system.

In some aspects, the techniques described herein relate to a method, further including in response to receiving via the at least one network a network response from the selected computer network processing system, updating at least one second data segment of the response of the plurality of data segments.

In some aspects, the techniques described herein relate to a method, wherein updating the at least one second data segment of the response is based on customized selection criteria customized by at least one of the selected computer network processing system, the computer network originator system, a customer, or an entity, wherein a message segment of the at least one second data segment is updated indicating a status of the routing package.

In some aspects, the techniques described herein relate to a method, further including in response to updating the at least one second data segment of the response, transmitting, in real-time via the at least one network with the computer network originator system, the updated response including the message indicating completion and the updated at least one second data segment to the computer network originator system.

In some aspects, the techniques described herein relate to a method, further including transmitting, in real-time to the at least one user, a notification indicating the completion of the updated response.

In some aspects, the techniques described herein relate to a method, further including: receiving the response from the selected computer network processing system responsive to transmitting the routing package to the selected computer network processing system for processing; updating the response from the selected computer network processing system to include information identifying the selected computer network processing system; and transmitting the updated response to the computer network originator system.

In some aspects, the techniques described herein relate to a system, including: one or more processing circuits configured to: receive, from an interface via at least one network, a request to generate at least one universal prescription card (UPC) for at least one user, wherein the at least one network is at least one of a local area network (LAN), wide area network (WAN), a telephone network, a wireless link, an intranet, or internet; issue at least one UPC to the at least one user; receive, via the at least one network, a routing package from a computer network originator system, the routing package including computer network routing information in the at least one UPC issued to the at least one user that causes the computer network originator system to transmit the routing package to the computer network routing system, wherein the routing package includes a plurality of data segments, wherein the computer network routing information uniquely identifies data corresponding to the UPC issued to the at least one user; select a computer network processing system from the plurality of computer network processing systems by applying a set of network rules to the routing package; update at least one first data segment of the plurality of data segments of the computer network routing information of the routing package based on a scheme of a plurality of schemes of the computer network processing system corresponding with criteria for the routing package to the selected computer network processing system; transmitting, via the at least one network to a network processing system computing system, the routing package to the selected network processing system corresponding with the updated computer network routing information; and transmitting, via the at least one network to the computer network originator system, an updated response including a message indicating completion by the network processing system computing system.

One implementation of the present disclosure is a prescription drug claim routing system for routing prescription drug claims between a pharmacy and a plurality of pharmacy benefit managers (PBMs). The system can include one or more processing circuits including one or more processors and memory storing instructions that, when executed by the one or more processors, cause the one or more processors to perform operations. The one or more processors can be configured to perform the operation of receiving a prescription drug claim from the pharmacy, the prescription drug claim including routing information that causes the pharmacy to send the prescription drug claim to the prescription drug claim routing system. Further, the one or more processors can be configured to perform the operation of obtaining a set of rules for routing the prescription drug claim. Further, the one or more processors can be configured to perform the operation of selecting a PBM from the plurality of PBMs by applying the set of rules to the prescription drug claim. Further, the one or more processors can be configured to perform the operation of modifying the routing information of the prescription drug claim to include updated routing information corresponding to the selected PBM, and sending the prescription drug claim to the selected PBM for processing in accordance with the updated routing information.

In some implementations, the one or more processors can be configured to perform the operation of receiving a claim response from the selected PBM responsive to sending the prescription drug claim to the selected PBM for processing, modifying the claim response from the selected PBM to include information identifying the selected PBM, and sending the modified claim response to the pharmacy.

In various implementations, obtaining the set of rules includes using one or more attributes of the prescription drug claim to select one or more rules applicable to the prescription drug claim, and the one or more rules applicable to the prescription drug claim define one or more criteria for selecting the PBM from the plurality of PBMs.

In some implementations, the selected PBM provides multiple different prescription plans, and selecting the PBM includes selecting a prescription plan from the multiple different prescription plans provided by the selected PBM by applying the set of rules to the multiple different prescription plans.

In various implementations, selecting the PBM from the plurality of PBMs includes using one or more attributes of the prescription drug claim to identify an insurance plan applicable to the prescription drug claim, and applying the set of rules to the insurance plan and one or more alternative prescription plans applicable to the prescription drug claim.

In some implementations, the set of rules defines a set of available prescription plan options for processing the prescription drug claim, each of the available prescription plan options corresponding to a PBM of the plurality of PBMs, selecting the PBM from the plurality of PBMs includes evaluating the set of available prescription plan options according to the set of rules to select a prescription plan from the set of available prescription plan options.

In various implementations, the one or more processors can be configured to perform the operation of sending the prescription drug claim to each PBM of the plurality of PBMs corresponding to the available prescription plan options, receiving claim responses from the plurality of PBMs corresponding to the available prescription plan options responsive to the prescription drug claim, and wherein evaluating the set of available prescription plan options includes evaluating the claim responses received the plurality of PBMs corresponding to the available prescription plan options according to the set of rules.

Another implementation of the present disclosure is a method for routing prescription drug claims between a pharmacy and a plurality of pharmacy benefit managers (PBMs). The method includes receiving a prescription drug claim from the pharmacy at a prescription drug claim routing system, the prescription drug claim including routing information that causes the pharmacy to send the prescription drug claim to the prescription drug claim routing system. Further, the method includes obtaining a set of rules for routing the prescription drug claim. Further, the method includes selecting a PBM from the plurality of PBMs by applying the set of rules to the prescription drug claim. Further, the method includes modifying the routing information of the prescription drug claim to include updated routing information corresponding to the selected PBM, and sending the prescription drug claim to the selected PBM for processing in accordance with the updated routing information.

In some implementations, the method further includes receiving a claim response from the selected PBM responsive to sending the prescription drug claim to the selected PBM for processing, modifying the claim response from the selected PBM to include information identifying the selected PBM, and sending the modified claim response to the pharmacy.

In various implementations, obtaining the set of rules includes using one or more attributes of the prescription drug claim to select one or more rules applicable to the prescription drug claim, and the one or more rules applicable to the prescription drug claim define one or more criteria for selecting the PBM from the plurality of PBMs.

In some implementations, the selected PBM provides multiple different prescription plans, and selecting the PBM includes selecting a prescription plan from the multiple different prescription plans provided by the selected PBM by applying the set of rules to the multiple different prescription plans.

In various implementations, selecting the PBM from the plurality of PBMs includes using one or more attributes of the prescription drug claim to identify an insurance plan applicable to the prescription drug claim, and applying the set of rules to the insurance plan and one or more alternative prescription plans applicable to the prescription drug claim.

In some implementations, the set of rules defines a set of available prescription plan options for processing the prescription drug claim, each of the available prescription plan options corresponding to a PBM of the plurality of PBMs, and selecting the PBM from the plurality of PBMs includes evaluating the set of available prescription plan options according to the set of rules to select a prescription plan from the set of available prescription plan options.

In various implementations, the method further includes sending the prescription drug claim to each PBM of the plurality of PBMs corresponding to the available prescription plan options, receiving claim responses from the plurality of PBMs corresponding to the available prescription plan options responsive to the prescription drug claim, wherein evaluating the set of available prescription plan options includes evaluating the claim responses received the plurality of PBMs corresponding to the available prescription plan options according to the set of rules.

Another implementation of the present disclosure is a prescription drug claim routing system for routing prescription drug claims between a pharmacy and a plurality of pharmacy benefit managers (PBMs). The system can include one or more processing circuits including one or more processors and memory storing instructions that, when executed by the one or more processors, cause the one or more processors to perform operations. The one or more processors can be configured to perform the operation of receiving a prescription drug claim generated by the pharmacy. Further, the one or more processors can be configured to perform the operation of obtaining a set of rules for routing the prescription drug claim. Further, the one or more processors can be configured to perform the operation of selecting a PBM from the plurality of PBMs by applying the set of rules to the prescription drug claim. Further, the one or more processors can be configured to perform the operation of modifying the prescription drug claim to include routing information corresponding to the selected PBM, and sending the prescription drug claim to the selected PBM for processing in accordance with the routing information.

In some implementations, the one or more processors can be configured to perform the operation of receiving a claim response from the selected PBM responsive to sending the prescription drug claim to the selected PBM for processing, and modifying the claim response from the selected PBM to include information identifying the selected PBM.

In various implementations, obtaining the set of rules comprises using one or more attributes of the prescription drug claim to select one or more rules applicable to the prescription drug claim, and the one or more rules applicable to the prescription drug claim define one or more criteria for selecting the PBM from the plurality of PBMs.

In some implementations, the selected PBM provides multiple different prescription plans, and selecting the PBM comprises selecting a prescription plan from the multiple different prescription plans provided by the selected PBM by applying the set of rules to the multiple different prescription plans.

In various implementations, selecting the PBM from the plurality of PBMs includes using one or more attributes of the prescription drug claim to identify an insurance plan applicable to the prescription drug claim, and applying the set of rules to the insurance plan and one or more alternative prescription plans applicable to the prescription drug claim.

In some implementations, the set of rules defines a set of available prescription plan options for processing the prescription drug claim, each of the available prescription plan options corresponding to a PBM of the plurality of PBMs, and selecting the PBM from the plurality of PBMs comprises evaluating the set of available prescription plan options according to the set of rules to select a prescription plan from the set of available prescription plan options.

Figure 1:
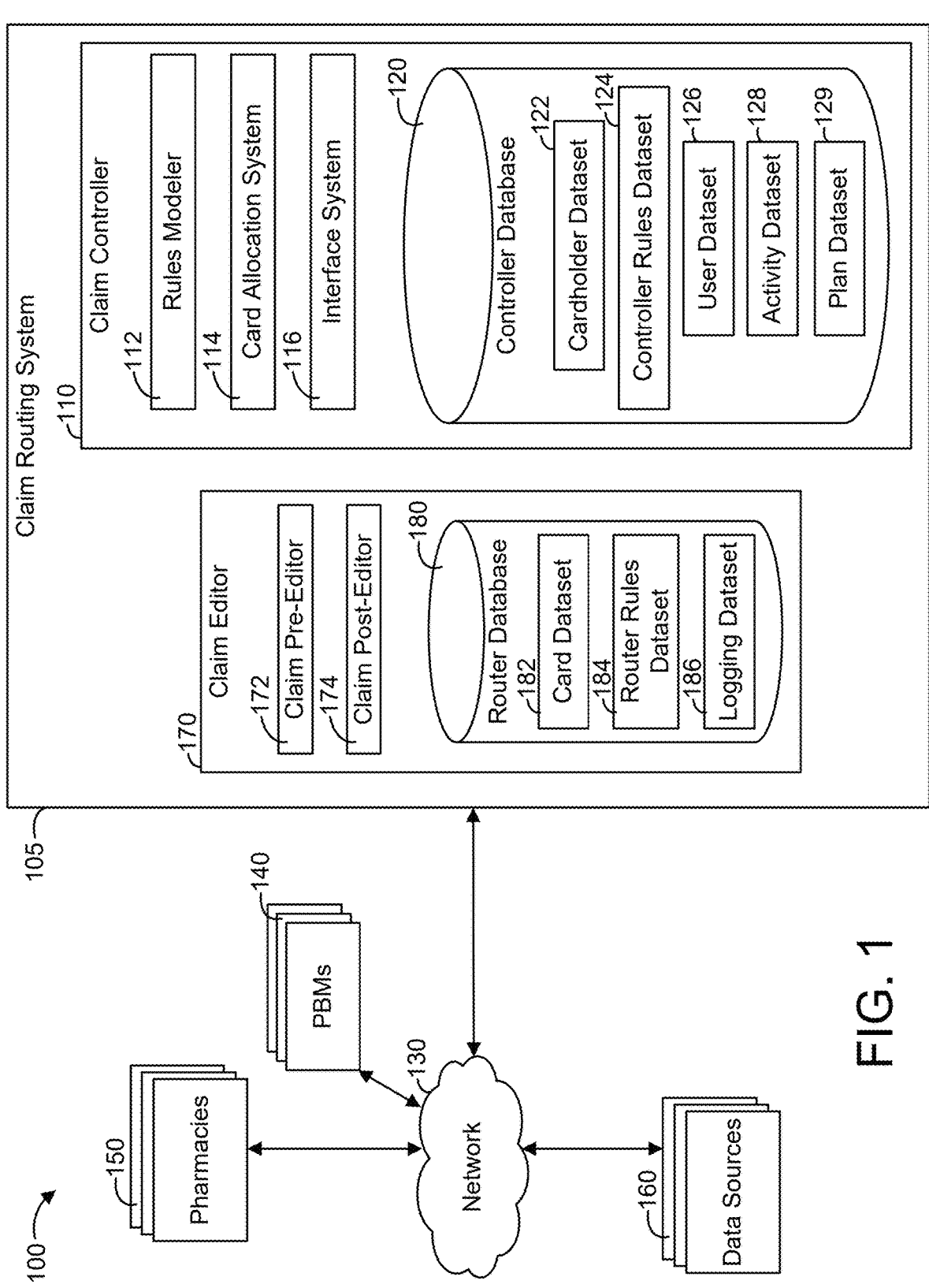
FIG. 1 is a block diagram depicting an example of a claim routing system, and associated environment, according to an illustrative implementation.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

The present disclosure pertains to systems and methods for routing prescription drug claims between a pharmacy and a plurality of pharmacy benefit managers (PBMs). In some embodiments, prescription drug claim routing can be performed on submitted drug claims from pharmacies. The prescription drug claim can include routing information that causes the pharmacy to send the prescription drug claim to the prescription drug claim routing system. The routing system can obtain a set of rules, select a PBM from a plurality of PBM to send the prescription drug claim, and modify the routing information to send the prescription drug claim to the selected PBM. Thus, the systems and methods described here describe a system to route prescription drug claims based on generated rule sets to increase the utilization of optimal pricing across PBMs and improve prescription drug claim adjudication architectures.

In general, PBMs handle prescription benefits for individuals who receive a prescription from a pharmacy. In particular, PBMs can be third-parties between individuals and/or plan sponsors (e.g., businesses, industries, schools, insurers, and governments) (collectively referred to herein as "customers") and the pharmacies. For example, customers can pay premiums to PBMs, and in return, the PBMs can negotiate, on the customer's behalf, with the pharmacy to lower the out-of-pocket price a customer pays for a prescription drug. PBMs can also work with drug companies and insurance companies to establish drug formularies. Drug formularies can be a list of drugs (e.g., generic, brand-name, etc.) covered by the customer's health plan. In some implementations, the drug formularies can be tiered based on various categories (e.g., generic, lowest copays, non-preferred generics, brand-name medications, specialty drugs, etc.) and the tiers can be indicative of how much a customer pays out-of-pocket for a particular drug. For example, Tier 1 of a drug formulary may include Brand A drug, and Brand B drug, which are preferred based on a PBMs drug formulary and may be the lowest copay for the customer. In this example, Tier 2 of the drug formulary may include Brand C drug which is non-preferred based on the PBMs drug formulary and may cost more than a drug in Tier 1 of the drug formulary. However, each PBM can establish a unique drug formulary such that drug placement on the unique drug formulary may be tiered differently. The unique drug formularies can be based on various factors, for example, but not limited to, safety, efficacy, cost of the drug, drug company rebates, drug company coupons, discount cards, effectiveness, if a generic version exists, etc.

In some systems, a pharmacy can submit a prescription drug claim to a PBM, and the prescription drug claim can be processed by the PBM. In some implementations, each PBM may have multiple different plans associated with the PBM. During the processing of a prescription drug claim, the pharmacy can receive payment information including, but not limited to, what the customer must pay to receive the prescription and how much the pharmacy will receive in return for the sale. The payment information can be determined based on the prescription plan of the customer, the pharmacy's contract with the PBM, the formulary, rebates, discounts, and/or various other factors. In one example, the customer may be required to pay a copay (e.g., $10), which may be a smaller amount of money compared to the drugs typical listed price (e.g., $250). In another example, the customer may be required to pay a percentage of the drug list price (e.g., 40%), which is still likely to be a smaller amount of money compared to the drug's typical listed price. In yet another example, the customer may have not met the deductible of their prescription plan and may be required to pay the full drug list price. However, the payment information sent by PBM X to pharmacy A, may be different than what is sent to pharmacy B. This is the case because pharmacy A may have a different contract with PBM A then pharmacy B does.

Furthermore, there are a plurality of PBMs (e.g., PBM X, PBM Y, PBM Z) that can all have different contracts with different pharmacies. For example, Pharmacy A may have a contract with PBM X and PBM Y, and Pharmacy B may have a contract with PBM X and PBM Z. In this example, one customer (e.g., John Doe) may have prescription plan K with PBM X, whereas another customer (e.g., Jane Doe) may have prescription plan L with PBM Z. Thus, in this example, if Jane Doe goes to Pharmacy A and provides prescription plan L, she may have to pay out-of-pocket the full list price for her prescription because PBM Z does not have a contract with Pharmacy A. If John Doe goes to Pharmacy A and provides prescription plan K, Pharmacy A would submit prescription drug claim to PBM X, and receive payment information including how much John Doe would have to pay out-of-pocket. As shown, if Jane Doe utilized PBM X, instead of PBM Z (determined by her prescription plan L), she would have reduced her out-of-pocket expenses. Additionally, Jane Doe may have been eligible for prescription plan L but was unaware. Moreover, Jane Doe and John Doe may have been eligible for prescription plan J, which could have provided the lowest out-of-pocket expenses for their prescriptions, but both were unaware of that plan. Thus, the ability to route prescription drug claims, such that a drug claim system can select an eligible PBM from a plurality of eligible PBMs to process a prescription drug claim, provides customers with lower out-of-pocket expenses.

In order to address this problem, the present disclosure describes a system that enables pharmacies to submit prescription drug claims to a prescription drug claim routing system instead of a particular PBM to enhance payment plan flexibility for customers (e.g., reducing cost, allowing pharmacy flexibility, reducing complexity of purchasing drugs, etc.). The prescription drug claim routing system can utilize a customizable selection criteria to route submitted prescription drug claims to appropriate PBMs for processing before the payment information is provided back to the pharmacy. In some implementations, the customer may present a single prescription card to the pharmacy but can be associated with a plurality of prescription plans across a plurality of PBMs. Therefore, aspects of the present disclosure address problems in handling prescription drug claims by routing particular claims to particular PBMs utilizing a drug claim processing architecture with a customized PBM selection criteria based on the customer.

Referring now to FIG. 1, a block diagram of a claim routing system 105, and associated environment 100 is shown, according to an illustrative implementation. Network 130 may include a local area network (LAN), wide area network (WAN), a telephone network, such as the Public Switched Telephone Network (PSTN), a wireless link, an intranet, the Internet, or combinations thereof. Each system and/or database can communicate via network 130 with one or more systems in associated environment 100. The claim controller 110 can also include at least one data processing system or processing circuit, such as those described below in detail with reference to FIG. 7. The one or more processing circuits can include a microprocessor, an application specific integrated circuit (ASIC), a field-programmable gate array (FPGA), etc., or combinations thereof. A memory can include, but is not limited to, electronic, optical, magnetic, or any other storage or transmission device capable of providing processor with program instructions. Instructions can include code from any suitable computer programming language.

Claim controller 110 can include the controller database 120 which may be configured to store a variety of information relevant to processing drug claims. Information may be received by one or more PBMs 140, one or more pharmacies 150, data sources 160, and/or claim editor 170, for example. The claim controller 110 can be configured to query the controller database 120 for information and store information in the controller database 120. In various implementations, the controller database 120 includes various transitory and/or non-transitory storage mediums. The storage mediums may include but are not limited to magnetic storage, optical storage, flash storage, RAM, etc. The controller database 120 and/or the claim controller 110 can use various APIs to perform database functions (i.e., managing data stored in the geographic experiment database 120). The APIs can be but are not limited to SQL, NoSQL, NewSQL, ODBC, JDBC, etc.

Claim editor 170 can be configured to exchange data with pharmacy 150, PBMs 140, and claim controller 110. Claim editor 170 is shown to include a claim pre-editor 172 and a claim post-editor 174. The claim editor 170 can include at least one data processing system or processing circuit, such as those described below in detail with reference to FIG. 7.

Claim editor 170 can include the editor database 180 which may be configured to store a variety of information relevant to processing drug claims. Information may be received by the PBMs 140, the pharmacies 150, the data sources 160, and/or the claim controller 110, for example. The claim editor 170 can be configured to query the router database 180 for information and store information in the router database 180. In various implementations, the router database 180 includes various transitory and/or non-transitory storage mediums. The storage mediums may include but are not limited to magnetic storage, optical storage, flash storage, RAM, etc. The router database 180 and/or the claim editor 170 can use various APIs to perform database functions (i.e., managing data stored in the geographic experiment database 120). The APIs can be but are not limited to SQL, NoSQL, NewSQL, ODBC, JDBC, etc.

In some implementations, the claim controller 110 and the claim editor 170 can be implemented as separate systems or integrated within a single system (e.g., the claim controller 110 can be configured to incorporate some or all of the functions/capabilities of the claim editor 170). In various implementations, the controller database 120 and the router database 180 can be implemented as separate databases or integrated within a single database (e.g., the controller database 120 can be configured store some or all of the data of router database 180).

Referring to the claim routing system 105 generally. The claim editor 170 can receive drug claim submissions from pharmacy 150 associated with one or more requested drugs (e.g., prescription drug, doctor prescribed treatment). Each drug claim submission may have a plurality of fields. The claim editor 170 can identify the submitting pharmacy identifier (e.g., a National Board of Pharmacy (NABP) number, National Provider Identifier (NPI), etc.) and drug identifier (e.g., National Drug Code (NDC), Generic Product Identifier (GPI), etc.) from the plurality of fields in the drug claim submission. In various implementations, the drug claim submission can also be edited (e.g., in real-time) by the claim pre-editor 172 based on generated rules by the claim controller 110 and stored in router rules dataset 184. In some implementations, the generated rules may be utilized by the claim editor 170 to edit the drug claim submission such that the routing information for a target PBM can be added to the drug claim submission. The drug claim submission can further be logged in the logging dataset 186 by the claim editor 170. In some implementations, the claim editor 170 can send the edited drug claim submission to the one or more PBMs 140 based on the routing information. The one or more PBMs 140 may provide a response to claim editor 170 adjudicating (e.g., paying or denying) the edited drug claim submission after comparing the edited drug claim submission to the benefit or coverage requirements. Adjudication of the edited drug claim can include determining the level of reimbursement to the pharmacy 150 that made the drug claim submission. In some implementations, the adjudicated drug claim submission can be further edited by the claim post-editor 174 based on generated rules by the claim controller 110 and stored in router rules dataset 184. The adjudicated drug claim submission can further be logged in the logging dataset 186 by the claim editor 170. In various implementations, the claim editor 170 can send the adjudicated drug claim submission back to pharmacy 150 including the price for the one or more requested drugs.

Pharmacy 150 may be configured to exchange data including drug claim submissions with claim editor 170, over network 130. The pharmacy 150 can be any entity or system that submits a prescription claim electronically (e.g., storefront, mail order pharmacies). In general, there can be a plurality of pharmacies, each having different contracts with different PBMs (e.g., PBM 140). For example, a customer may be prescribed a drug by their doctor and visit a pharmacy (e.g., in-person, virtually via the internet). In the following example, the customer may present their universal prescription card (UPC) to the pharmacy in which the pharmacist will initiate a drug claim submission with claim editor 170. In some implementations, a drug claim submission can include identifying information (or attributes) associated with a UPC. For example, the UPC may include, but is not limited to, an ID number (e.g., 408002), a group identifier (e.g., UNITY), a bank identification number (BIN) (e.g., 111111), and a processor control number (PCN) (e.g., AAA). In another example, the UPC may include, but is not limited to, a member name (e.g., Member A), a group identifier (e.g., 1234567), an Rx Group identifier (e.g., ABCDEF), a BIN (e.g., 222222), a medical network (e.g., Texas Plus 1), and copay information (e.g., emergency room co-pay: $75, retail Rx: $10/$25/$45, mail-order Rx: $25/ $52/$112). The data may be data inputted for particular entities or users (e.g., customers, customer purchases) at one or more points in time at pharmacy 150.

PBMs 140 may be configured to exchange data including drug information with claim editor 170 over network 130. The PBM 140 can be any entity or system that adjudicates (or processes) prescription drug claims. In general, there can be a plurality of PBMs, each having different contracts with different pharmacies (e.g., pharmacies 150). For example, one PBM of PBMs 140 may provide discount drug pricing to be used in comparing plans across multiple PBMs. In another example, another PBM of PBMs 140 may provide both discount drug pricing, as well as insured copay pricing for registered plans and members to be used in comparing plans across multiple PBMs. In yet another example, yet another PBM of PBMs 140 may provide copay benefit information for registered plans and members to be used in comparing plans across multiple PBMs. In various implementations, claim editor 170 can provide an edited drug claim submission to the one or more PBMs 140. Upon receiving an edited drug claim submission, the PBMs 140 can adjudicate the drug claim and provide a response including the adjudicated drug claim submission and the level of reimbursement to pharmacy 150 (e.g., via network 130 and claim routing system 105). In some implementations, each PBM may have multiple different plans associated with the PBM.

Data sources 160 may include data collected by the claim controller 110 based on receiving discount plan data and insurance plan data from various customers (e.g., businesses, industries, schools, insurers, partners, public entities, PBMs, and governments) via network 130. The data may include identifying information associated with a discount plan and/or insurance plan. For example, the discount plan data could include a plurality of discounts plans collected from various customers. In another example, the insurance plan data could include a plurality of insurance plans collected from various customers. The discount plan data and/or insurance plan data may include data associated with a plurality of entities, a plurality of users, a specific entity, a specific user, etc. Data sources 160 may also be various data aggregating systems and/or entities that collect discount plan data and/or insurance plan data. This information may be stored as plan data in the plan dataset 129.

Claim controller 110 may include one or more systems (i.e., computer-readable instructions executable by a processor) and/or circuits (i.e., ASICs, Processor Memory combinations, logic circuits, etc.) configured to perform various functions of the claim controller 110. In some implementations, the systems may be or include a rules modeler 112, a card allocation system 114, and an interface system 116. It should be understood that various implementations may include more, fewer, or different systems than illustrated in FIG. 1, and all such modifications are contemplated within the scope of the present disclosure.

Referring to the claim controller 110 generally. The rules modeler 112 can be configured to collect plan information from discount plans and insurance plans (e.g., from data sources 160) and store the collected plan information into the plan dataset 129. The card allocation system 114 can be configured to generate cards for one or more individuals and/or customers and store card data in cardholder dataset 122. The interfaces system 116 can be configured to generate and provide one or more interfaces, such as but not limited to, discount plan interface, insurance plan interface, support interface, engagement interface, reporting interface, user delivery interface, and rule delivery interface. One or more interfaces of the interface system 116 can be configured to communicate (e.g., query, store) with one or more datasets of controller database 120 (e.g., user dataset 126, activity dataset 128, and plan dataset 129).

Claim editor 170 may include one or more systems (i.e., computer-readable instructions executable by a processor) and/or circuits (i.e., ASICs, Processor Memory combinations, logic circuits, etc.) configured to perform various functions of the claim editor 170. In some implementations, the systems may be or include a claim pre-editor 172 and a claim post-editor 174. It should be understood that various implementations may include more, fewer, or different systems than illustrated in FIG. 1, and all such modifications are contemplated within the scope of the present disclosure.

Claim pre-editor 172 can be configured to modify received drug claim submissions from pharmacy 150 based on one or more rules determined by rules modeler 112. The claim post-editor 174 can be configured to modify received adjudicated drug claim submissions from PBM 140 based on one or more rules determined by rules modeler 112. Additional details relating to the functions of the claim controller 110 and claim editor 170 are provided herein with respect to FIG. 2-4.

Figure 2:
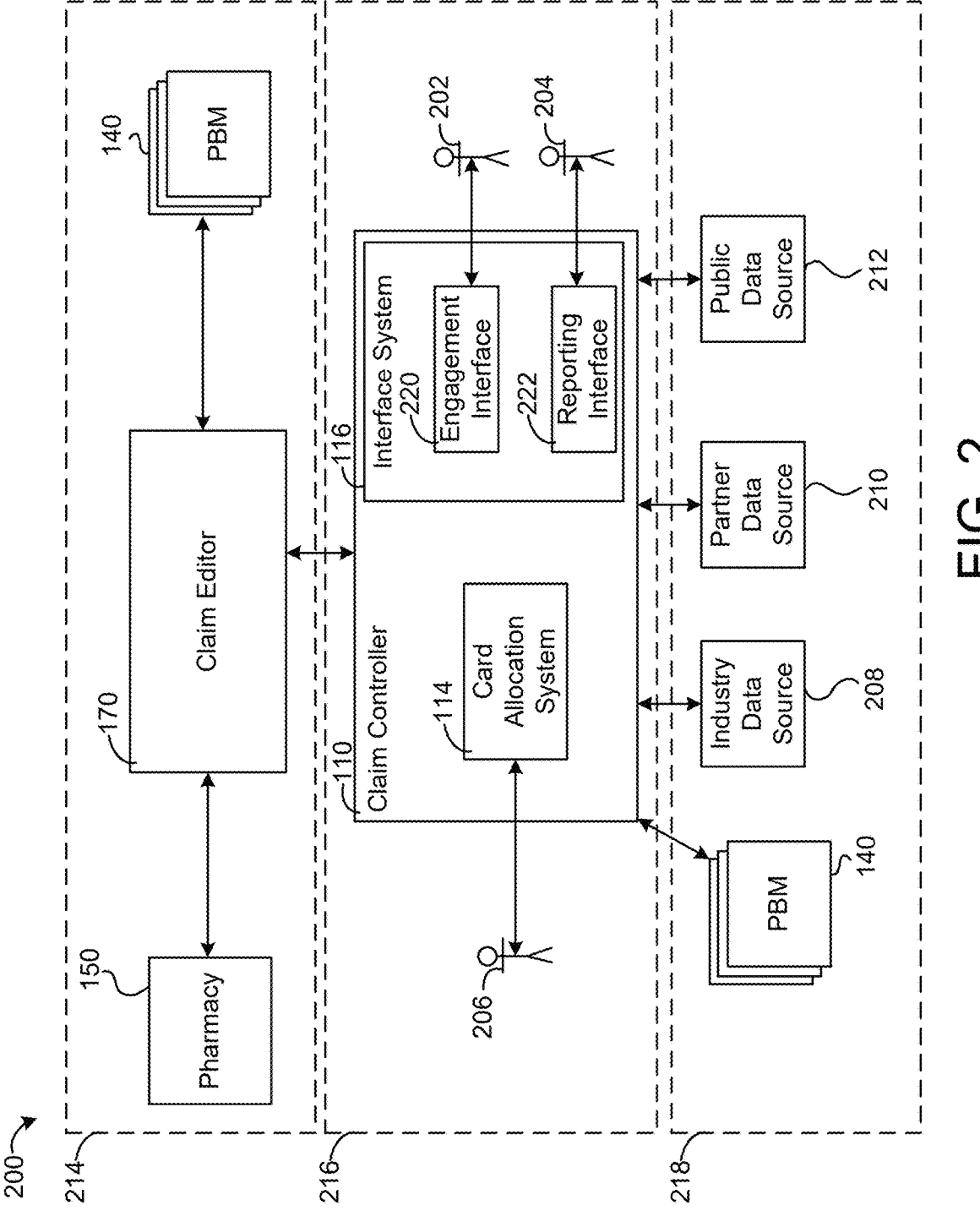
FIG. 2 is a block diagram depicting an implementation of a claim processing architecture, according to an illustrative implementation.

Referring now to FIG. 2, a block diagram depicting an implementation of a claim processing architecture 200, according to an illustrative implementation. The claim processing architecture 200 is shown to include a claim processing layer 214, rules/interface (RI) layer 216, and data source layer 218, each including various systems. As shown, data can flow bidirectionally (e.g., sent and received) from the various systems.

In some implementations, the claim processing layer 214 can process drug submission claims initiated at pharmacy 150. For example, pharmacy 150 can submit a prescription drug claim to claim editor 170 associated with the universal prescription card (UPC) of a customer. In this example, in real-time, the claim editor 170 can utilize a customizable selection criteria to route submitted prescription drug claims to one or more PBMs 140 for processing before the payment information is provided back to the pharmacy. In various implementations, the customizable selection criteria can be set by the user and/or the pharmacy. In some implementations, the customizable selection criteria can also be set by claim controller 110 based on data collected from various systems described herein (e.g., pharmacy 150, PBM 140, data sources 160). Customizable selection criteria can include, but is not limited to, lowest price for the customer, highest reimbursement for the pharmacy, highest rebate for the plan administrator, available copay and customer assistance plans based on a card user's profile, preferred or non-preferred PBM(s) based on pharmacy preferences PBMs with available generic effective rate (GER) (e.g., GER load balancing), insurance price versus cash price threshold, and/or default plan when no other customizable selection criteria are met. Additionally with reference to the above example, PBMs 140 can adjudicate the prescription drug claim and route the payment information back to the claim editor 170. As shown, the customer and pharmacy may provide customizable selection criteria but the claim editor 170 may determine which PBM of the PBMs 140 the prescription drug claim gets routed to. In some implementations, the customer and/or pharmacy may indicate a specific PBM (or a plurality of PBMs) the prescription drug claim should be routed to. In some implementations, all communicate between layers of the one or more processing circuits can be done over network 130 (resembling similar features and functionalities of network 130 in FIG. 1). Furthermore, in various implementations, each PBM may have multiple different plans associated with the PBM and the selection process can in selecting not only a PBM, but also a plan provided by that PBM. For example, a PBM may provide prescription plan A and prescription plan B. In this example, the claim editor 170 may select prescription plan A, prescription plan B, or both of them based on the customizable selection criteria. Further in this example, if both prescriptions plans are selected, the claim editor 170 may route the prescription drug claim to the same PBM but with different routing information based on the prescription plan.

In some implementations, the RI layer 216 can receive requests from one or more processing circuits of claim editor 170. For example, claim controller 110 can send (e.g., continuously, autonomously, on request) claim processing rule structures (or dataset) to claim editor 170. In various implementations, the RI layer 216 can receive communication at the card allocation system from user 206. For example, card allocation system 114 can receive a new UPC request. In this example, the card allocation system 114 can generate a unique UPC for user 206 including various information such as, but not limited to, a bank identification number (BIN) (e.g., 222222), a processor control number (PCN) (e.g., AAA), a group identifier (ID) (e.g., UNITY), and a cardholder identifier (e.g., 123321jd). In some implementations, the RI layer 216 can also receive customer communication at the interface system 116, in particular, engagement interface 220 and reporting interface 222 from user 202 and user 204. In some implementations, user 202, user 204, and user 206 may be a computing device (e.g., user device, smart device, mobile device, computer, etc.). In some implementations, the engagement interface 220 can be configured to communicate (e.g., via network 130) with user 202 based on event triggers. An event trigger can be a configuration set by a user (e.g., 202, 204) such that each user can receive customized notifications based on the event triggers. For example, a message (e.g., text, email, application notification) may be sent to user 202 (e.g., customer), over network 130, notifying user 202 a refill may be needed for a previous prescribed drug. In this example, user 202 may have set an event trigger such that a notification is provided when a refill may be needed. In another example, a message may be sent to user 202 (e.g., prescriber), over network 130, notifying user 202 of real-time any outstanding medications that have not been picked up by customers. In this example, user 202 may have set an event trigger such that a notification is provided every day indicating outstanding medications for pick-up. In various implementations, reporting interface 222 can be configured to provide (e.g., via network 130) with user 204 (e.g., may be the same user as user 202, or may be a different user) data visualization tools. The one or more processing circuits of the interface system 116 can generate reports depicting activity, performance, pricing, and rules information associated with claim controller 110. For example, user 204 (e.g., pharmacist) may run a report, utilizing a graphical user interface (GUI) provided by the reporting interface 222, to analyze a customer's prescription history. In another example, user 204 (e.g., insurance company) may run a report for all its members using the UPC to calculate one or more member's remaining deductibles. In various implementations, the interface system 116 can include additional interfaces as described in detail with reference to FIG. 4.

In some implementations, the data source layer 218 can resemble similar features and functionalities of data source 160 in FIG. 1. As shown, the data sources can include an industry data source 208, a partner data source 210, and public data source 212. In various implementations, PBM 140 can also be configured to provide data as a data source. For illustration reasons, PBM 140 is shown in both the claim processing layer 214 and data source layer 218. Each data source can provide various data. For example, industry data source 208 could be a data analytics company that can provide (e.g., when queried, autonomously, scheduled) pharmaceutical data (e.g., market trends, pricing trends, new drugs, recalls, side effects, efficacy of different drugs, etc.). In another example, partner data source 210 could an insurance company that provides (e.g., when queried, autonomously, scheduled) plans for the UPC's described herein, and can provide insurance data (e.g., drug prices, co-pays, reimbursement information, plan information, etc.). In yet another example, the public data source 212 can be provide (e.g., when queried, autonomously, scheduled) public available pharmaceutical data (e.g., market trends, pricing trends, new drugs, recalls, side effects, efficacy of different drugs, Better Business Bureau (BBB) ratings for PBMs or Pharmacies, litigation information, etc.). In yet another example, each PBM 140 can provide (e.g., when queried, autonomously, scheduled) various prescription drug information (e.g., formularies, rebates, discounts, coupons, etc.)

Figure 3:
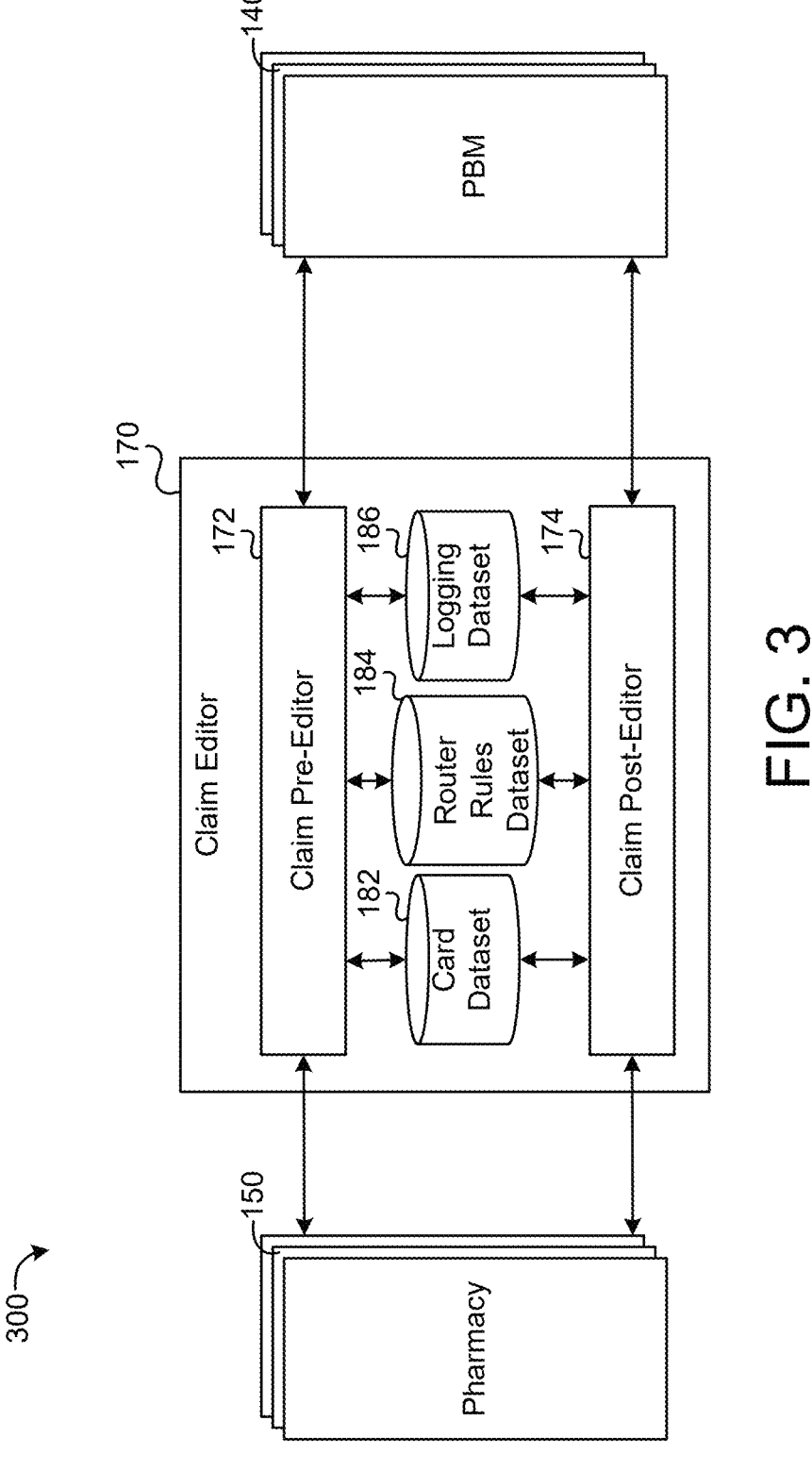
FIG. 3 is a block diagram depicting a claim editor and associated environment, according to an illustrative implementation.

Referring now to FIG. 3, a block diagram depicting a claim editor 170 and associated environment 300, according to an illustrative implementation. As described in detail about with reference to FIG. 1., claim editor 170 can be configured to exchange data with pharmacy 150, PBM 140, and claim controller 110. Claim editor 170 is shown to include a claim pre-editor 172, a claim post-editor 174, a card dataset 182, a router rules dataset 184, and a logging dataset 186. Referring to the claim editor 170 and associated environment 300 generally. The PBMs 140, pharmacies 150, and claim editor 170 can all communicate over network 130 described in detail with reference to FIG. 1. The PBMs 140, pharmacies 150, and claim editor 170 can each include at least one data processing system or processing circuit, such as those described below in detail with reference to FIG. 7. The pharmacies 150 can submit prescription drug claims to claim editor 170 and receive claim response with adjudicated PBM information from claim editor 170. The claim editor 170 can receive prescription drug claims from pharmacies 150 and route the prescription drug claim to one or more PBMs of PBMs 140 based on a set of rules. The claim editor 170 can also receive adjudicated prescription drug claims from the one or more PBMs and provide a claim response to pharmacies 150. In some implementations, the PBMs 140 can provide (e.g., in real-time, schedule, autonomously) pricing information (e.g., formulary, discounts, coupons, etc.) to claim editor 170. The PBMs 140 can receive routed prescription drug claims from claim editor 170 and send adjudicated prescription drug claims to claim editor 170. As shown in the architecture, the claim editor 170 can be architected as a system in between the pharmacies 150 and PBMs 140. The architecture provides improvements to prescription drug claim adjudication architectures by routing prescription drug claims based on applying a set of rules of one or more different prescription plans to one or more PBMs from a plurality of PBMs 140. This approach allows prescription drug claim adjudication architectures to provide significant improvements to the PBM submission process of prescription drug claims on a communication network and can provide significant cost savings by routing prescription drug claims to an optimal PBM based on a set of rules. The PBMs 140 and pharmacies 150 are described above in detail with reference to FIG. 1.

Referring to the claim editor 170 in more detail. The claim editor 170 can be configured to perform a claim routing process that can be triggered from incoming prescription drug claims from pharmacy 150. The prescription drug claim can include various information associated with a UPC and/or payment card. The various information may be grouped into various segments of data (collectively referred to herein as "attributes" and/or "fields"). For example, a prescription drug claim may include transaction segment fields that can include, but is not limited to, the BIN and PCN. In this example, the prescription drug claim may also include insurance segment fields that can include, but is not limited to, the Rx Group identifier, and ID number. In yet another example, the prescription drug claim may also include response insurance segment fields that can include, but is not limited to, Network Reimbursement Identifier (NRI). In yet another example, the prescription drug claim may also include response message segment fields that can include, but is not limited to, message field. The claim editor 170 can query against the router rules dataset 184 to determine the rule set (sometimes referred to herein as "a set of rules"). In various implementations, the rule set can define a set of available prescription plan options for processing the prescription drug claim, and where each of the available prescription plan options can correspond to a PBM of the plurality of PBMs 140. In some implementations, the claim editor 170 can inquire with the PBM for pricing information (e.g., formulary, discounts, coupons, etc.). The rule set can be generated and updated by the claim controller 110. In various implementations, the prescription drug claim can also include, but is not limited to, customer segment fields (e.g., customer identifying information), prescriber segment field (e.g., prescriber identifying information), pharmacy segment fields (e.g., customer identifying information), pricing segment fields (e.g., pricing information such as, deductible, copay, etc.), or any combination.

In some implementations, the claim editor 170 can further be configured to select the PBM from the plurality of PBMs 140 to route the prescription drug claim to for adjudication. In some implementations, the claim pre-editor 172 can update the attributes of the prescription drug claim to reflect the plan and PBM that will be adjudicating (or processing) the prescription drug claim. For example, after determining the prescription drug claim should be routed to PBM A, the claim pre-editor 172 may modify the BIN (e.g., 612314), PCN (e.g., 112), Rx Group Identifier (e.g., RX07), and NRI (e.g., 524-FF) to reflect the criteria (e.g., plan scheme) for submitted the prescription drug claim to PBM A. In another example, after determining the prescription drug claim should be routed to PBM B, the claim pre-editor 172 may modify the BIN (e.g., 501203), PCN (e.g., 928), Rx Group Identifier (e.g., MPx87), and NRI (e.g., 23G-5N) to reflect the criteria for submitting the prescription drug claim to PBM B. In some implementations, the claim pre-editor may modify the received prescription drug claim multiple times and send it to multiple PBMs (e.g., PBM A and PBM B) for adjudication. In particular, in various scenarios, upon determining multiple available plan options, the claim pre-editor 172 may simultaneously send a modified prescription drug claim unique to each of the PBMs for adjudication.

In various implementations, the claim post-editor 174 can receive adjudicated prescription drug claims, via network 130. In some implementations, if there are multiple adjudicated prescription drug claim responses the claim post-editor 174 can compare the responses and select the optimal plan. In selecting the optimal plan, the claim post-editor 174 can utilize the rule set stored in router rules dataset 184. In particular, the rule set may include customizable selection criteria set by a user or entity (e.g., customer, pharmacy, insurance provider, etc.). For example, the customizable selection criteria could be utilized by the claim post-editor 174 to select the optimal plan based on the lowest price for the customer (e.g., customized by the customer). In another example, the customizable selection criteria could be utilized by the claim post-editor 174 to select the optimal plan based on the highest reimbursement for the pharmacy (e.g., customized by the pharmacy). In yet another example, the customizable selection criteria could be utilized by the claim post-editor 174 to select the optimal plan based on the highest rebate for the plan administrator (e.g., customized by the insurance company). In yet another example, the customizable selection criteria could be utilized by the claim post-editor 174 to select the optimal plan based on the available copay and customer assistance plans (e.g., customized by the claim editor 170 based on querying the card dataset 182 and/or data sources 160). In some implementations, the claim post-editor 174 can modify the adjudicated prescription drug claim based on the PBM response and the adjudication information. In various implementations, the claim post-editor 174 may modify the NRI of the segments with PBM and/or adjudication information. For example, the claim post-editor 174 may modify the NRI of the response insurance segment (e.g., defined by the claim editor 170 and can identify the network, for the covered customer, used in calculating the reimbursement to the pharmacy), the message field of the response message segment (e.g., "Complete"), and the response pricing segment (e.g., patient pay amount, ingredient cost paid, dispending fee paid).

In various implementations, all prescription drug claims routed by the claim editor 170 (e.g., received from pharmacy 150, received from PBM 140) can be logged in logging dataset 186. In some implementations, the card dataset 182 can be queried by the claim pre-editor 172 and/or claim post-editor 174 to include card data for a plurality of UPCs and other prescription cards. In particular, the card dataset 182 can include card information and rule preferences for routing claims by claim editor 170. That is, the cardholder dataset 122 can store, but not limited to, user profile information (e.g., names, age, income, etc.), the user's UPC, insurance information (e.g., BIN, PCN, Group, ID), rule preference(s) (e.g., pick the lowest patient paid amount), plan preferences (e.g., only use X, Y, Z plans), and communication and data access opt-ins, and so on. However, the card dataset 182 may cache the card information and rule preferences associated with the cardholder dataset 122 but can be used in routing claims by claim editor 170. Further, by using the card dataset 182, this technical solution can provide improved claim processing speed of drug claims without receiving or transmitting protected or private information via the network. This not only protects claim editor 170 from exposing the protected claim and/or entity information, but also protects PBMs 140 and Pharmacies 150 from exposing their protected or private information, which is a significant improvement to the security of networking systems. Thus, the information in the card dataset 182 is not susceptible to data breaches or man-in-the-middle attacks, which is an improvement over pharmacy submitting claims directly to PBMs. Additional details relating the issuance and allocation of cards are described in detail herein with reference to card allocation system 114.

Figure 4:
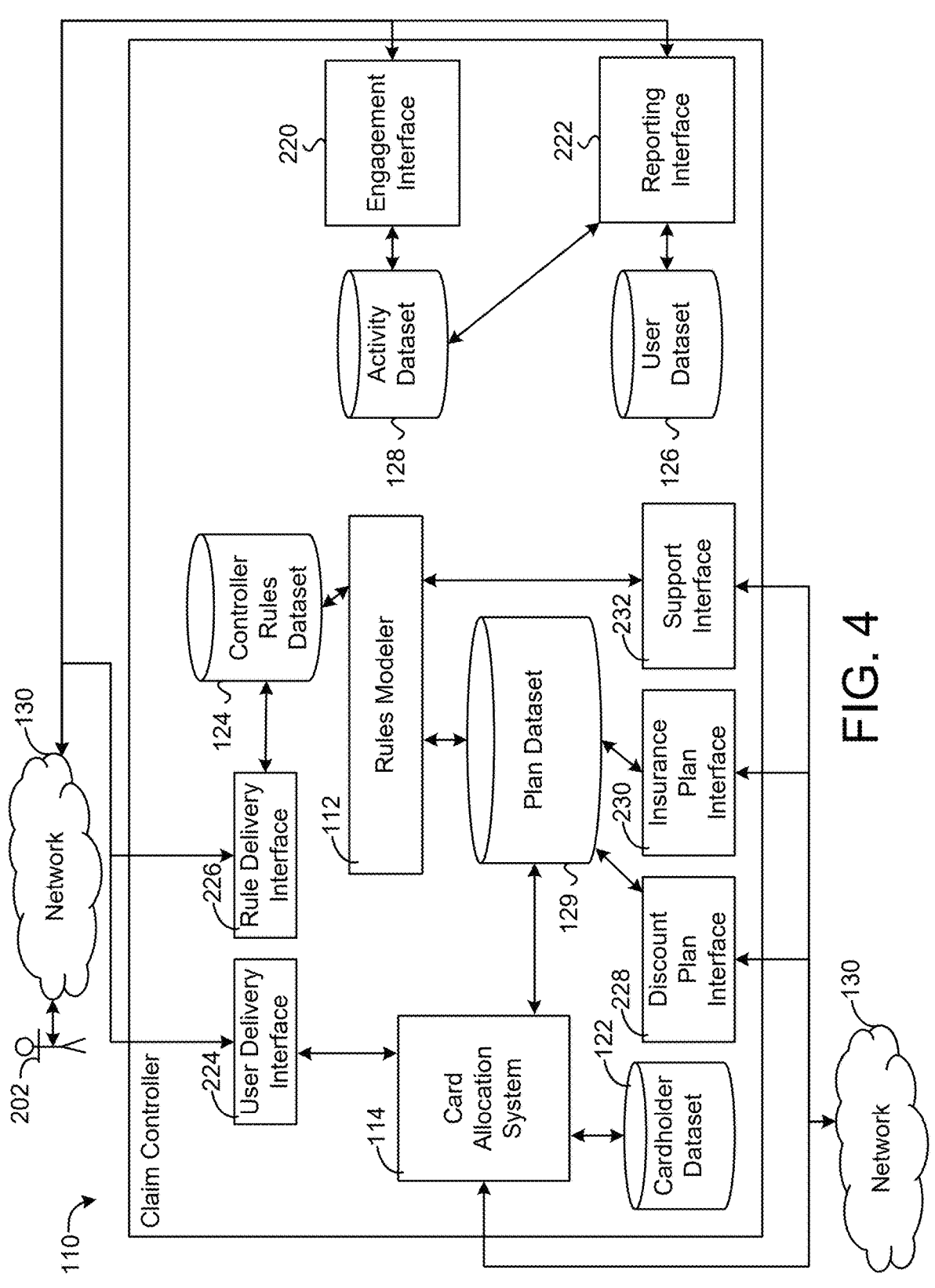
FIG. 4 is a block diagram depicting a claim controller, according to an illustrative implementation.

Referring now to FIG. 4, a block diagram depicting a claim controller 110, according to an illustrative implementation. As described in detail about with reference to FIG. 1., claim controller 110 can be configured to exchange (e.g., customers, insurers, prescribers, pharmacists, caregivers) user data with one or more systems described herein, via network 130. Claim controller 110 is shown to include a rules modeler 112, a card allocation system 114, a cardholder dataset 122, a controller rules dataset 124, a user dataset 126, an activity dataset 128, a plan dataset 129, and a plurality of interfaces including, but not limited to, an engagement interface 220, a reporting interface 222, a user delivery interface 224, a rules delivery interface 226, a discount plan interface 228, an insurance plan interface 230, and a support interface 232. In some implementations, the plurality of interfaces can be implemented as separate systems or integrated within a single system (e.g., interface system 116 in FIG. 1 can be configured incorporate some or all of the functions/capabilities of some or all of the plurality of interfaces). In various implementations, the dataset (e.g., 122, 124, 126, 128, 129) can be implemented as separate databases or integrated within a single database (e.g., controller database 120 can be configured store some or all of the dataset). The claim controller 110 can include at least one data processing system or processing circuit, such as those described below in detail with reference to FIG. 7.

Rules modeler 112 can be configured to generate claim processing rule sets (collectively referred to herein as "rule sets" or "a set of rules"). The rules modeler 112 can communicate with plan dataset 129 (e.g., via querying) and support interface 232 to utilize various information to generate rule sets. In some implementations, a rule set can include a plurality of rules associated with specific fields of a prescription drug claim (described above). Profile information about a cardholder such as personal information collected by the card allocation system 114 and stored in the plan dataset 129 may also be used to create rule sets.

An employer, pharmacy, PBM, or any plan administrator could be someone who uses the support interface 232 to set up rules for their associated cards (e.g., UPCs). The processing rules are pushed (e.g., scheduled, real-time, autonomously) as rule sets to the rules modeler 112. For example, a plan administrator can log into the support interface 232 (e.g., with an account previously registered) where they can create a rule for their members to always receive the lowest price drug. In another example, a pharmacy can log into the support interface 232 and create a rule to only use certain plans and not others. In yet another example, a discount card program can log into the support interface 232 and creates rules to use more profitable plans based on the drug or pharmacy.

In various implementations, created rules can be customized selection criteria specific to UPCs, providers, pharmacies, customers, etc. For example, a price rule could be for BIN 610679, select the plan with the lowest price for the customer. In another example, a pharmacy rule could be that if pharmacy is equal to provider A, do not use plan X. In yet another example, a drug rule could be that if drug is equal to Crestor use plan Y. In yet another, a customer assistant rule could be that if customer age is greater than sixty-four years of age and the claim state is equal to Texas and customer income is less than $45,000 then us plan Z. In yet another example, a generic effective Rate balancer rule could be that if the drug is equal to generic, and Plan A GER is greater than the wholesale price use Plan B. In some implementations, the created rules can be utilized by rules modeler 112 to create individual rule sets unique to UPCs, providers, pharmacies, customers, etc.

Plan dataset 129 can store various data received from the card allocation system 114, discount plan interface 228, and insurance plan interface 230. In some implementations, the discount plan interface 228 can be configured to collect, generate, and receive discount plan data and drug pricing data. The discount plan data and drug pricing data can be stored in plan dataset 129. In various implementations, the insurance plan interface 230 can be configured to collect, generate, and receive insurance plan data and copay pricing data. The Insurance plan data and copay pricing data can also be stored in plan dataset 129.

In some implementations, the card allocation system 114 can be configured to provide a graphical user interface for a user (e.g., customers, insurers, prescribers, pharmacists, caregivers) to register and receive an issued UPC. For example, a customer device (e.g., mobile phone, desktop computer, laptop) may interact with a website (e.g., using an internet browser) that provides graphical user interface. The user may be requested to provide information such as personal information (e.g., names, addresses, phone numbers, age, income, ethnicity, insurance plan information, and so on), authentication information (e.g., username/password combinations, device authentication tokens, security question answers, unique customer identifiers, biometric data, geographic data, social media data, etc.), and financial information (e.g., token information, account numbers, account balances, etc.) relating to the user. In various implementations, the card allocation system 114 may generate a UPC for one or more users (e.g., individual and/or bulk) based on the provided information. The UPC can include various routing information to route prescription drug claims to the claim editor 170. For example, the routing information can include, but is not limited to, a BIN, PCN, Group ID, Cardholder ID, unique CVC. In some implementations, the generated UPC can be linked to an insurance plan associated with the user. The received information and generated UPCs can be stored in plan dataset 129 and/or cardholder dataset 122. In one example, an employer may upload employee's information to card allocation system 114 (e.g., via network 130) for generation of a UPC for each employee. In another example, a prescriber may provide a request for a UPC to the card allocation system 114 (e.g., via network 130) after a customer's first office visit.

In various implementations, the cardholder dataset 122 can store, but not limited to, user profile information (e.g., names, age, income, etc.), the user's UPC, insurance information (e.g., BIN, PCN, Group, ID), rule preference(s) (e.g., pick the lowest patient paid amount), plan preferences (e.g., only use X, Y, Z plans), and communication and data access opt-ins, and so on. In some implementations, the plan dataset 129 can store, but not limited to, various PBM discount and insurance plan information, plan details (BIN, PCN, Group ID, Cardholder ID), and drug pricing for cash pay and insurance (e.g., if not getting pricing by adjudicating the claim real-time).

Interface system 116 (shown in FIG. 1) can be configured to communicate via network 130, for example with claim editor 170, PBMs 140, pharmacies 150, and/or data sources 160. For illustration purposes, each interface is shown to be implemented as separate systems. However, it should be understood that the interface system 116 could include each interface in a single system. In general, each interface (e.g., 220, 222, 224, 226, 228, 230, and 232) can be configured to provide an interface to a customer, user, or another system described herein, for a particular task and/or action. In some implementations, a user device (e.g., user 202, 204, 206 with reference to FIG. 2) may execute a web browser application, which is provided an interface on a viewport of the user device. The web browser application that provides the interface may operate by receiving input of a uniform resource locator (URL), such as a web address, from an input device (e.g., a pointing device, a keyboard, a touch screen, or another form of input device). In response, one or more processors of the user device executing the instructions from the web browser application may request data and/or provide data from another device connected to the network 130 referred to by the URL address (e.g., claim controller 110). The other device may then provide webpage data and/or other data to the user device, which causes the interface to be presented by the viewport of the user device 101. Accordingly, the browser window presents the interface to facilitate user interaction with the interfaces described herein.

Reporting interface 222 may be configured to enable users (e.g., customers, insurance companies, self-insured employer groups, prescribers, caregivers, etc.) to view data visualization tools (e.g., historic claim activity across multiple PBMs and plans). For example, a self-insured employer (e.g., user 202) may run a report to analyze how much they saved on prescription drug costs by having one or more employees utilize a UPC. In another example, a customer or insurance company could access the reporting interface 222 (e.g., via a user device such as processing circuit 900) to calculate remaining deductible amounts. In yet another example, a prescriber could access the reporting interface 222 to view a customer's claim history to monitor prescription adherence.

Engagement interface 220 may be configured to communicate (e.g., via network 130) with user 202 based on event triggers. Event triggers notification can include, but is not limited to, pricing information or changes, savings, refill notifications, adherence and abandonment information, deductible notifications, and prior authorization notices. For example, a message (e.g., text, email, application notification) may be sent to user 202 (e.g., customer), over network 130, notifying user 202 when they have successfully linked their insurance plan to their UPC. In some implementations, incentives, like gift cards, may be sent to user 202 to encourage certain behaviors (e.g., pick up a medication, see a doctor, etc.).

Also as shown, the reporting interface 222 and engagement interface 220 can query the user dataset 126 and activity dataset 128 for various data that is provided in the data visualization tools and/or notifications/event triggers. In some implementations, the user dataset 126 can store credentials (e.g., login information) for people authorized to access the reporting interface 222. In various implementations, the reporting interface 222 can be configured to access and/or query the activity dataset 128 for the claim routing logs/activity.

User delivery interface 224 and rule delivery interface 226 can be configured to providing data for make routing decisions to claim editor 170 (e.g., where transactions may happen in milliseconds). In particular, the user delivery interface 224 can push (or transmit) data such as, but not limited to, user's UPC, insurance information (e.g., BIN, PCN, Group, ID), rule preference(s) (e.g., pick the lowest patient paid amount), and plan preferences (e.g., only use X, Y, Z plans), whereas the rule delivery interface 226 can push (or transmit) data to the router rules dataset 184 such as, but not limited to, the plan (e.g., BIN, PCN, Group ID, and Cardholder ID) with the lowest price at a particular pharmacy for a particular drug. Furthermore, both the user delivery interface 224 and the rule deliver interface 226 can update the card dataset 182 and router rules dataset 184 when any changes were detected (e.g., entity provides updated information, customer modifies a preference, customer changes their job, PBM modifies formularies, etc.)

Figure 5:
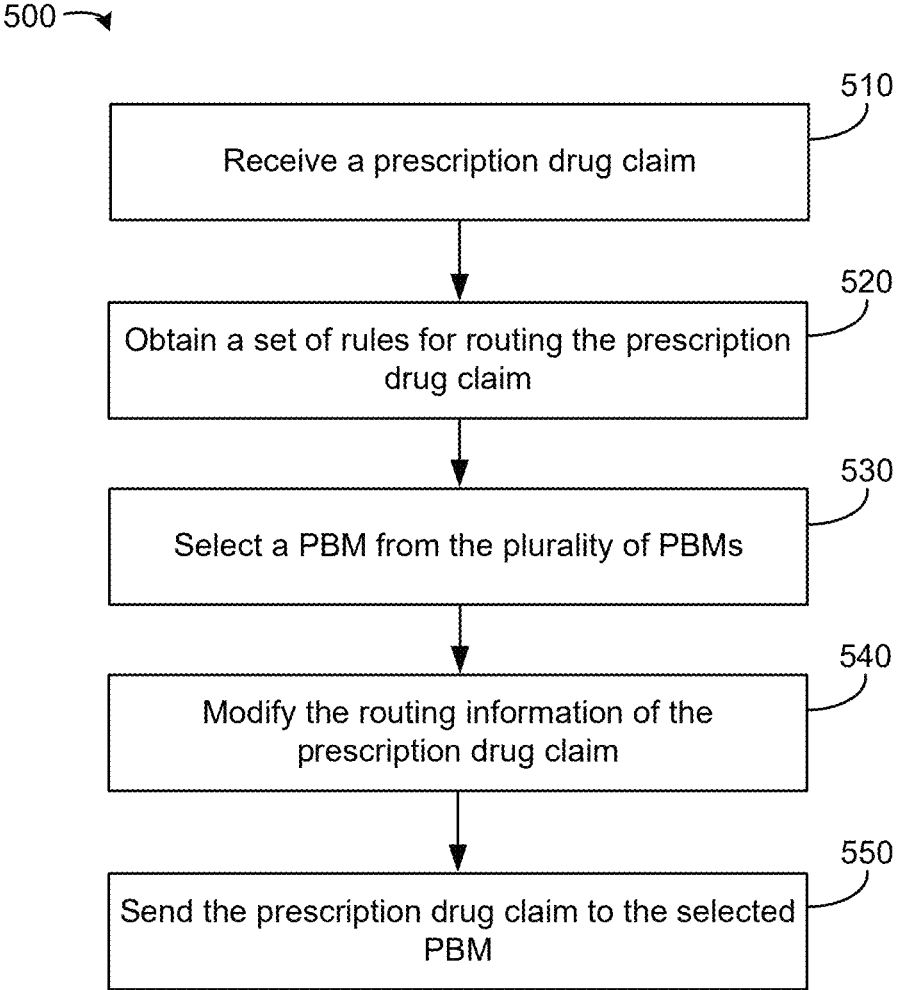
FIG. 5 is a flowchart for a method of routing prescription drug claims, according to an illustrative implementation.

Referring now to FIG. 5, a flowchart for a method 500 for routing prescription drug claims between a pharmacy and a plurality of pharmacy benefit managers (PBMs). Claim controller 110, claim editor 170, and associated environment 100 can be configured to perform method 500.

In broad overview of method 500, at block 510, one or more processing circuits of a prescription drug claim routing system (e.g., claim editor 170 in FIG. 1, computer system 700 in FIG. 7) can receive a prescription drug claim. At block 520, the one or more processing circuits can obtain a set of rules for routing the prescription drug claim. At block 530, the one or more processing circuits can select a PBM from the plurality of PBMs. At block 540, the one or more processing circuits can modify the routing information of the prescription drug claim. At block 550, the one or more processing circuits can send the prescription drug claim to the selected PBM. Additional, fewer, or different operations may be performed depending on the particular arrangement. In some arrangements, some or all operations of method 500 may be performed by one or more processors executing on one or more computing devices, systems, or servers. In various arrangements, each operation may be re-ordered, added, removed, or repeated.

Referring to method 500 in more detail. At block 510, the one or more processing circuits (e.g., claim editor 170 in FIG. 1) can receive a prescription drug claim from the pharmacy at a prescription drug claim routing system, the prescription drug claim including routing information that causes the pharmacy to send the prescription drug claim to the prescription drug claim routing system. The routing information can include attributes and fields associated with various entities and/or users (e.g., pharmacy identifying information, type of drug requested, insurance plan information, group identifiers, charge information, routing addresses, etc.) throughout the drug claim submission process.

At block 520, the one or more processing circuits can obtain a set of rules for routing the prescription drug claim. In some implementations, the set of rules can be generated and provided by the claim controller 110. The set of rules can define a set of available prescription plan options for processing (or adjudicating) the prescription drug claim, each of the available prescription plan options corresponding to a PBM of the plurality of PBMs.

At block 530, the one or more processing circuits can select a PBM from the plurality of PBMs by applying the set of rules to the prescription drug claim. In various implementations, selecting the PBM from the plurality of PBMs includes evaluating the set of available prescription plan options according to the set of rules to select a prescription plan from the set of available prescription plan options. In some implementations, the selected PBM provides multiple different prescription plans. In such scenario, selecting the PBM includes selecting a prescription plan from the multiple different prescription plans provided by the selected PBM by applying the set of rules to the multiple different prescription plans. Furthermore, selecting the PBM from the plurality of PBMs can include using one or more attributes (or fields) of the prescription drug claim to identify an insurance plan applicable to the prescription drug claim and applying the set of rules to the insurance plan and one or more alternative prescription plans applicable to the prescription drug claim.

At block 540, the one or more processing circuits can modify the routing information of the prescription drug claim to include updated routing information corresponding to the selected PBM. For example, the ID, GRP, BIN, and PCN may be modified based on the selected PBM.

At block 550, the one or more processing circuits can send the prescription drug claim to the selected PBM for processing in accordance with the updated routing information. In various implementations, the claim editor 170 can send the prescription drug claim to a PBM of PBMs 140. In some implementations, the prescription drug claim may be sent to a plurality of PBMs for processing such that the claim editor 170 can analyze one or more PBMs response and apply the customized selection criteria. Additionally, the one or more processing circuits can receive a claim response from the selected PBM responsive to sending the prescription drug claim to the selected PBM for processing. The one or more processing circuits can modify the claim response from the selected PBM to include information identifying the selected PBM and send the modified claim response to the pharmacy.

In some implementations, the pharmacy 150 and the claim editor 170 can be implemented as separate systems or integrated within a single system (e.g., the pharmacy can be configured to incorporate some or all of the functions/capabilities of the claim editor 170). In the following implementation, the pharmacy 150 can generate a prescription drug claim, obtain a set of rules for routing the prescription drug claim, select a PBM from the plurality of PBMs by applying the set of rules to the prescription drug claim, modify the prescription drug claim to include routing information corresponding to the selected PBM, and send the prescription drug claim to the selected PBM for processing in accordance with the routing information.

Figure 6:
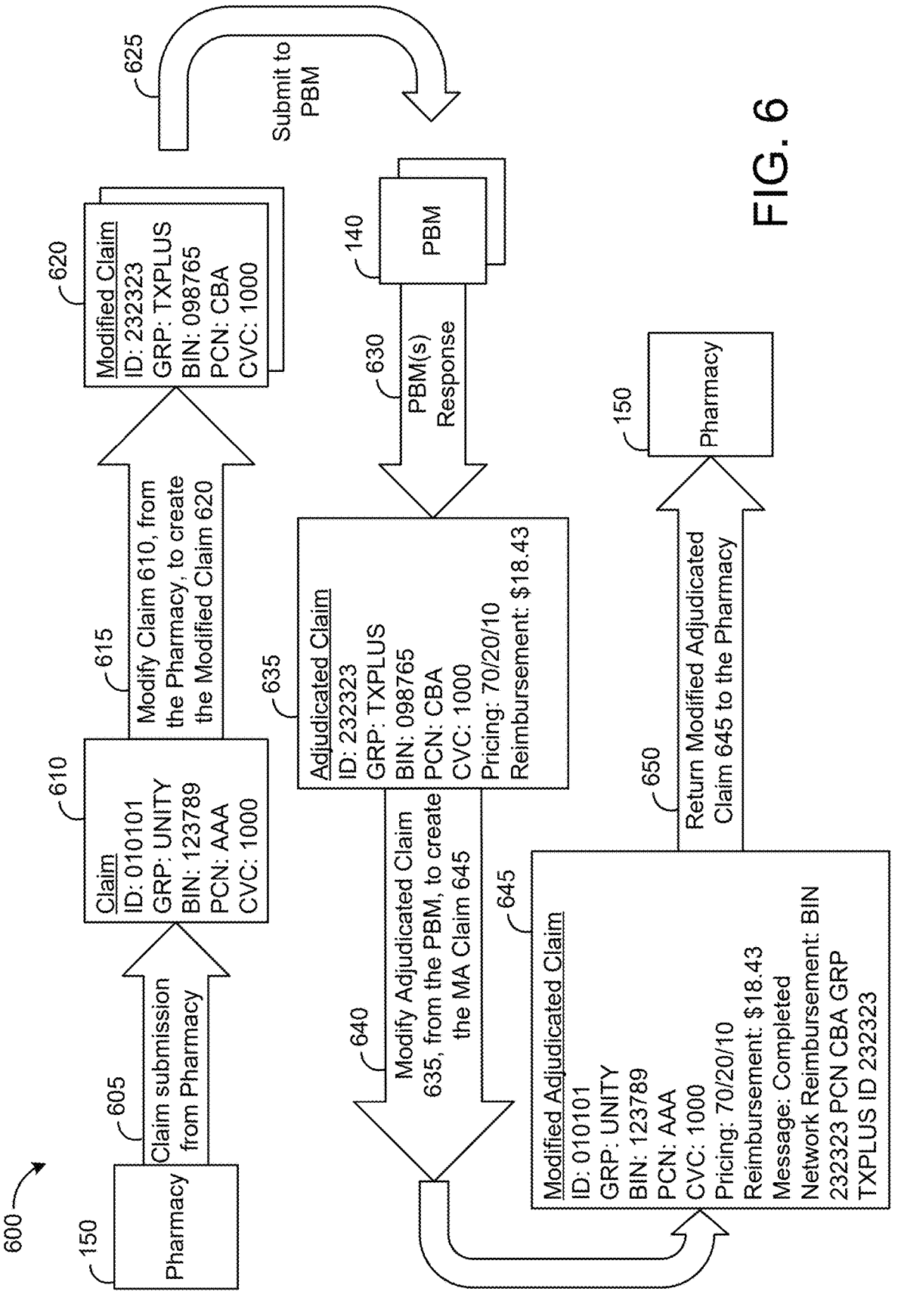
FIG. 6 is a block diagram depicting an example of a claim processing workflow in connection with the drug claim processing architecture, according to an illustrative implementation.

Referring now to FIG. 6, a block diagram depicting an example of a claim processing workflow 600 in connection with the drug claim processing architecture of FIGS. 1-2 is shown, according to an illustrative implementation. In some implementations, a pharmacy (e.g., 150) can submit 605 a claim 610 to claim routing system 105. The claim editor 170 can receive the drug claim 610 and modify (modification 615) the claim 610 based on the rule set and the selected one or more PBMs 140 to generate a modified claim 620. In some implementations, the modification 615 can include updating the routing information to send the modified claim 620 to the select PBM(s) 140. As shown and in some implementations, the modified claim 620 may be modified a plurality of times (e.g., unique to a PBM) when the claim editor 170 determines the prescription drug claim should be sent to more than one PBM. The PBM(s) 140 can provide a response 630 with an adjudicated claim 635 to claim routing system 105. The claim editor 170 can receive the adjudicated claim 635 and modify (modification 640) the adjudicated claim 635 based on the rule set and the pharmacy 150 to generate a modified adjudicated claim 645. In some implementations, the modification 640 can include updating the routing information to send the modified adjudicated claim 645 to the pharmacy 150. As shown, the modified adjudicated drug claim 645 can be sent 650 back to pharmacy 150 with reimbursement information and/or a message (e.g., dispensing info, copay, out-of-pocket cost for customer, failure to process by PBM, etc.).

Figure 7:
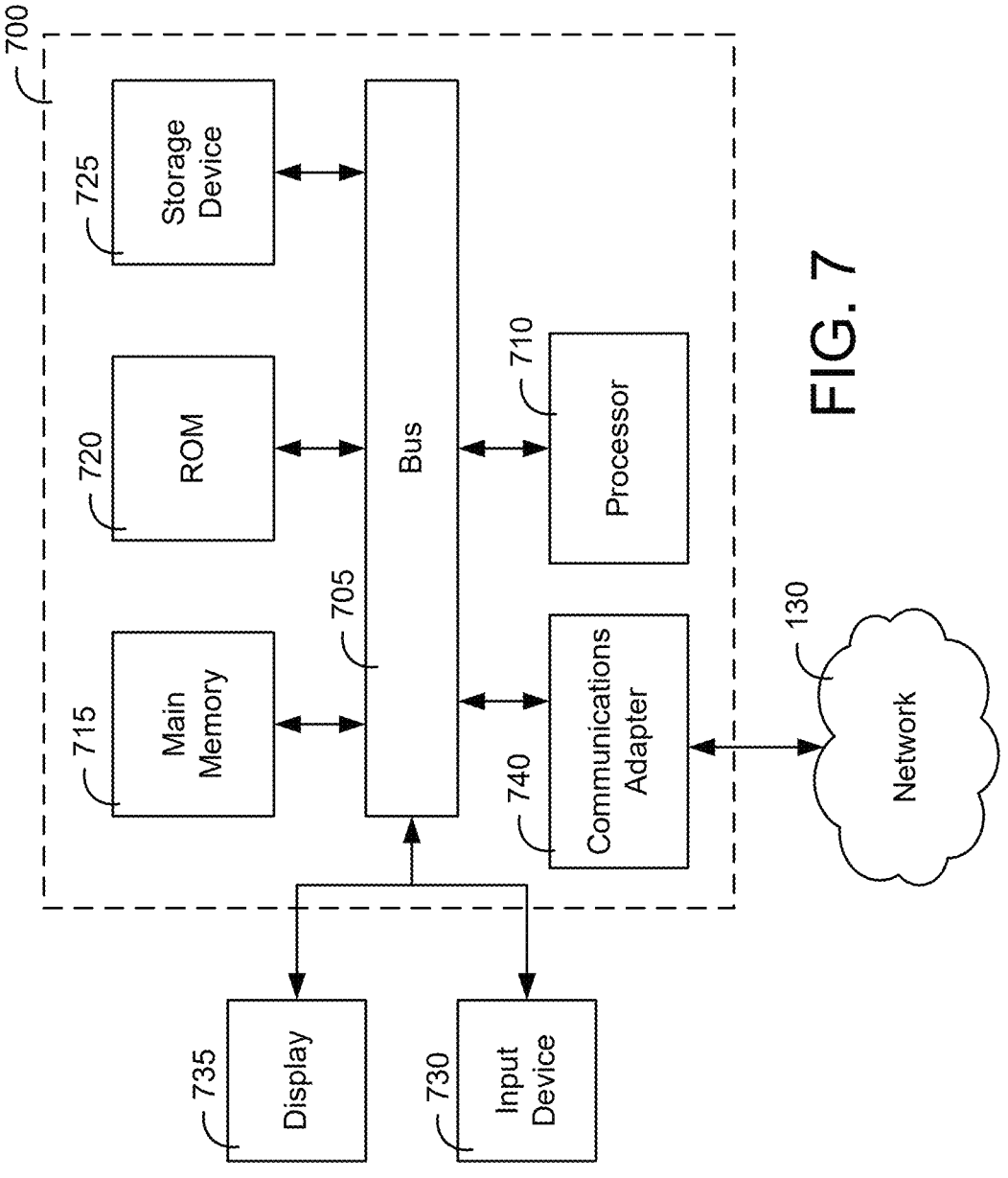
FIG. 7 is a block diagram illustrating an example computing system suitable for use in the various implementations described herein.

FIG. 7 illustrates a depiction of a computer system 700 that can be used, for example, to implement a claim controller 110, controller database 120, PBMs 140, a pharmacies 150, a claim editor 170, a router database 180, and/or various other example systems described in the present disclosure. The computing system 700 includes a bus 705 or other communication component for communicating information and a processor 710 coupled to the bus 705 for processing information. The computing system 700 also includes main memory 715, such as a random-access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid-state device, magnetic disk or optical disk, is coupled to the bus 705 for persistently storing information and instructions.

Computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another arrangement, the input device 730 has a touch screen display 735. The input device 730 can include any type of biometric sensor, a cursor control, such as a mouse, a trackball, or cursor direction keys, for communicating direction information and command selections to the processor 710 and for controlling cursor movement on the display 735.

In some arrangements, the computing system 700 may include a communications adapter 740, such as a networking adapter. Communications adapter 740 may be coupled to bus 705 and may be configured to enable communications with a computing or communications network 250 and/or other computing systems. In various illustrative arrangements, any type of networking configuration may be achieved using communications adapter 740, such as wired (e.g., via Ethernet), wireless (e.g., via Wifi, Bluetooth, and so on), satellite (e.g., via GPS) pre-configured, ad-hoc, LAN, WAN, and so on.

According to various arrangements, the processes that effectuate illustrative arrangements that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 7, arrangements of the subject matter and the functional operations described in this specification can be carried out using other types of digital electronic circuitry, or in computer software embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The terms "data processing system" or "processor" encompass all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices, magnetic disks, e.g., internal hard disks or removable disks, magneto-optical disks, and CD-ROM and DVD-ROM disks. The processor and the memory can be supplemented by, or incorporated in, special purpose logic circuitry.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback, and input from the user can be received in any form, including acoustic, speech, tactile input, or other biometric information. In addition, a computer can interact with a user by sending documents to and receiving documents from a device that is used by the user, for example, by sending web pages to a web browser on a user's customer device in response to requests received from the web browser.

Arrangements of the subject matter described in this specification can be carried out using a computing system that includes a back-end component, e.g., as a data server, or that includes a middleware component, e.g., an application server, or that includes a front-end component, e.g., a client (or customer) computer having a graphical user interface or a web browser through which a user can interact with an arrangement of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network 130. The relationship of client and server arises by virtue of computer programs running on the respective computers and having a client-server relationship to each other. In some arrangements, a server transmits data (e.g., an HTML page) to a client device (e.g., for purposes of displaying data to and receiving user input from a user interacting with the client device). Data generated at the client device (e.g., a result of the user interaction) can be received from the client device (or customer device) at the server.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings, headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements, and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A computer network routing system for routing packages between a plurality of computer network originator systems and a plurality of computer network processing systems, the computer network routing system comprising:

one or more processing circuits comprising one or more processors and memory storing instructions that, when executed by the one or more processors, cause the one or more processors to perform operations comprising:

providing, via at least one network, an interface for registering at least one user with a computer network routing system, wherein the at least one network is at least one of a local area network (LAN), wide area network (WAN), a telephone network, a wireless link, an intranet, or internet;

receiving, from the interface via the at least one network, a request to generate at least one universal prescription card (UPC) for the at least one user;

generating the at least one UPC for the at least one user, the at least one UPC comprising computer network routing information that causes a computer network originator system to transmit one or more routing packages to the computer network routing system using the computer network routing information in the UPC;

issuing the at least one UPC to the at least one user;

receiving, via the at least one network, a routing package from the computer network originator system, the routing package comprising the computer network routing information in the at least one UPC issued to the at least one user that causes the computer network originator system to transmit the routing package to the computer network routing system, wherein the routing package comprises a plurality of data segments, wherein the computer network routing information uniquely identifies data corresponding to the UPC issued to the at least one user;

US 12,568,043 B1

29

30 selecting a computer network processing system from the plurality of computer network processing systems by applying a set of network rules to the routing package, the set of network rules defining a set of currently available plan options for processing the routing package, each of the set of currently available plan options corresponding to a computer network processing system of the plurality of computer network processing systems;

updating at least one first data segment of the plurality of data segments of the computer network routing information of the routing package based on a scheme of a plurality of schemes of the computer network processing system corresponding with criteria for the routing package to the selected computer network processing system;

in response to updating the at least one first data segment of the routing package, transmitting, via the at least one network to a network processing system computing system, the routing package to the selected network processing system corresponding with the updated computer network routing information; and transmitting, via the at least one network to the computer network originator system, an updated response comprising a message indicating completion by the network processing system computing system.

2. The computer network routing system of claim 1, wherein the at least one first data segment comprising updated computer network routing information corresponding to the selected computer network processing system, wherein the at least one first data segment is updated to convert a portion of the computer network routing information from first computer network routing information not specific to the selected network processing system into second computer network routing information specific to the selected computer network processing system.

3. The computer network routing system of claim 1, the operations further comprising:

in response to receiving via the at least one network a network response from the selected computer network processing system, updating at least one second data segment of the response of the plurality of data segments.

4. The computer network routing system of claim 3, wherein updating the at least one second data segment of the response is based on customized selection criteria customized by at least one of the selected computer network processing system, the computer network originator system, a customer, or an entity, wherein a message segment of the at least one second data segment is updated indicating a status of the routing package.

5. The computer network routing system of claim 3, the operations further comprising:

in response to updating the at least one second data segment of the response, transmitting, in real-time via the at least one network with the computer network originator system, the updated response comprising the message indicating completion and the updated at least one second data segment to the computer network originator system.

6. The computer network routing system of claim 3, the operations further comprising:

transmitting, in real-time to the at least one user, a notification indicating the completion of the updated response.

7. The computer network routing system of claim 1, the operations further comprising:

receiving the response from the selected computer network processing system responsive to transmitting the routing package to the selected computer network processing system for processing;

updating the response from the selected computer network processing system to comprise information identifying the selected computer network processing system; and transmitting the updated response to the computer network originator system.

8. The computer network routing system of claim 1, wherein:

obtaining the set of network rules comprises using one or more attributes of the routing package to select one or more network rules applicable to the routing package; and the one or more network rules applicable to the routing package define the criteria for selecting the computer network processing system from the plurality of computer network processing systems.

9. The computer network routing system of claim 1, wherein:

the request identifies a plan of the at least one user;

the selected computer network processing system provides multiple different plans; and selecting the computer network processing system comprises selecting the plan from the multiple different plans provided by the selected computer network processing system by applying the set of network rules to the multiple different plans.

10. The computer network routing system of claim 1, wherein selecting the computer network processing system from the plurality of computer network processing systems comprises:

using one or more attributes of the routing package to identify a plan applicable to the routing package; and applying the set of network rules to the plan and one or more alternative plans applicable to the routing package.

11. The computer network routing system of claim 1, wherein:

selecting the computer network processing system from the plurality of computer network processing systems comprises analyzing the set of currently available plan options according to the set of network rules to select a plan from the set of currently available plan options.

12. The computer network routing system of claim 11, the operations further comprising:

transmitting the routing package to each computer network processing system of the plurality of computer network processing systems corresponding to the set of currently available plan options; and receiving additional responses from the plurality of computer network processing systems corresponding to the set of currently available plan options responsive to the routing package;

wherein analyzing the set of currently available plan options comprises analyzing the additional responses received the plurality of computer network processing systems corresponding to the set of currently available plan options according to the set of network rules.

13. A method for routing packages between a plurality of computer network originator systems and a plurality of computer network processing systems, the method comprising:

providing, via at least one network, an interface for registering at least one user with a computer network routing system, wherein the at least one network is at least one of a local area network (LAN), wide area network (WAN), a telephone network, a wireless link, an intranet, or internet;

receiving, from the interface via the at least one network, a request to generate at least one universal prescription card (UPC) for the at least one user;

generating the at least one UPC for the at least one user, the at least one UPC comprising computer network routing information that causes a computer network originator system to transmit one or more routing packages to the computer network routing system using the computer network routing information in the UPC;

issuing the at least one UPC to the at least one user;

receiving, via the at least one network, a routing package from the computer network originator system, the routing package comprising the computer network routing information in the at least one UPC issued to the at least one user that causes the computer network originator system to transmit the routing package to the computer network routing system, wherein the routing package comprises a plurality of data segments, wherein the computer network routing information uniquely identifies data corresponding to the UPC issued to the at least one user;

selecting a computer network processing system from the plurality of computer network processing systems by applying a set of network rules to the routing package, the set of network rules defining a set of currently available plan options for processing the routing package, each of the set of currently available plan options corresponding to a computer network processing system of the plurality of computer network processing systems;

updating at least one first data segment of the plurality of data segments of the computer network routing information of the routing package based on a scheme of a plurality of schemes of the computer network processing system corresponding with criteria for the routing package to the selected computer network processing system;

in response to updating the at least one first data segment of the routing package, transmitting, via the at least one network to a network processing system computing system, the routing package to the selected network processing system corresponding with the updated computer network routing information; and transmitting, via the at least one network to the computer network originator system, an updated response comprising a message indicating completion by the network processing system computing system.

14. The method of claim 13, wherein the at least one first data segment comprising updated computer network routing information corresponding to the selected computer network processing system, wherein the at least one first data segment is updated to convert a portion of the computer network routing information from first computer network routing information not specific to the selected network processing system into second computer network routing information specific to the selected computer network processing system.

15. The method of claim 13, further comprising:

in response to receiving via the at least one network a network response from the selected computer network processing system, updating at least one second data segment of the response of the plurality of data segments.

16. The method of claim 15, wherein updating the at least one second data segment of the response is based on customized selection criteria customized by at least one of the selected computer network processing system, the computer network originator system, a customer, or an entity, wherein a message segment of the at least one second data segment is updated indicating a status of the routing package.

17. The method of claim 15, further comprising:

in response to updating the at least one second data segment of the response, transmitting, in real-time via the at least one network with the computer network originator system, the updated response comprising the message indicating completion and the updated at least one second data segment to the computer network originator system.

18. The method of claim 15, further comprising:

transmitting, in real-time to the at least one user, a notification indicating the completion of the updated response.

19. The method of claim 13, further comprising:

receiving the response from the selected computer network processing system responsive to transmitting the routing package to the selected computer network processing system for processing;

updating the response from the selected computer network processing system to comprise information identifying the selected computer network processing system; and transmitting the updated response to the computer network originator system.

20. A system, comprising:

one or more processing circuits configured to:

receive, from an interface via at least one network, a request to generate at least one universal prescription card (UPC) for at least one user, wherein the at least one network is at least one of a local area network (LAN), wide area network (WAN), a telephone network, a wireless link, an intranet, or internet;

issue at least one UPC to the at least one user;

receive, via the at least one network, a routing package from a computer network originator system, the routing package comprising computer network routing information in the at least one UPC issued to the at least one user that causes the computer network originator system to transmit the routing package to the computer network routing system, wherein the routing package comprises a plurality of data segments, wherein the computer network routing information uniquely identifies data corresponding to the UPC issued to the at least one user;

select a computer network processing system from the plurality of computer network processing systems by applying a set of network rules to the routing package, the set of network rules defining a set of currently available plan options for processing the routing package, each of the set of currently available plan options corresponding to a computer network processing system of the plurality of computer network processing systems;

update at least one first data segment of the plurality of data segments of the computer network routing information of the routing package based on a scheme of a plurality of schemes of the computer network processing system corresponding with criteria for the routing package to the selected computer network processing system;

transmit, via the at least one network to a network processing system computing system, the routing package to the selected network processing system corresponding with the updated computer network routing information; and transmit, via the at least one network to the computer network originator system, an updated response comprising a message indicating completion by the network processing system computing system.

\* \* \* \* \*